US008054775B2

(12) United States Patent
Soong et al.

(10) Patent No.: US 8,054,775 B2
(45) Date of Patent: Nov. 8, 2011

(54) POWER CONTROL FOR REVERSE PACKET DATA CHANNEL IN CDMA SYSTEMS

(75) Inventors: Anthony C. K. Soong, Superior, CO (US); Seong-Jun Oh, San Diego, CA (US); Shiau-He Shawn Tsai, San Diego, CA (US); Young C. Yoon, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 980 days.

(21) Appl. No.: 11/867,368

(22) Filed: Oct. 4, 2007

(65) Prior Publication Data

US 2008/0025265 A1  Jan. 31, 2008

Related U.S. Application Data

(62) Division of application No. 10/779,518, filed on Feb. 13, 2004, now Pat. No. 7,299,402.

(60) Provisional application No. 60/447,432, filed on Feb. 14, 2003, provisional application No. 60/479,551, filed on Jun. 18, 2003.

(51) Int. Cl.
*H04B 7/185* (2006.01)
(52) U.S. Cl. .................................. 370/318; 370/332
(58) Field of Classification Search .............. 370/335, 370/318, 332
See application file for complete search history.

(56) References Cited

U.S. PATENT DOCUMENTS

| 6,035,210 | A | * | 3/2000 | Endo et al. | 455/522 |
| 6,498,785 | B1 | * | 12/2002 | Derryberry et al. | 370/311 |
| 2002/0155853 | A1 | * | 10/2002 | Lee et al. | 455/522 |
| 2003/0031142 | A1 | * | 2/2003 | Jou | 370/320 |
| 2003/0050086 | A1 | * | 3/2003 | Lee et al. | 455/522 |
| 2004/0196800 | A1 | * | 10/2004 | Padovani et al. | 370/321 |

* cited by examiner

*Primary Examiner* — Kevin C Harper
*Assistant Examiner* — Sai-Ming Chan
(74) *Attorney, Agent, or Firm* — Coats & Bennett, P.L.L.C.

(57) ABSTRACT

A method of reverse link power control for a reverse packet data channel in a wireless communication system allows a mobile station to autonomously change its data transmission rate. The mobile station transmits packet data over a reverse packet data channel having a data rate variant transmit power level that varies based on a transmit data rate on the packet data channel. The mobile station further transmits control signals over a reverse control channel associated with the reverse packet data channel. The transmit power level of the reverse control channel is such that the transmit power level does not vary with the transmit data rate on the packet data channel. The radio base station measures the strength of the received signals on the reverse control channel, compares the measured strength to a power control set point, and generates a power control signal responsive to the comparison of the control signal to the power control set point.

8 Claims, 8 Drawing Sheets

POWER CONTROL FOR REVERSE PACKET DATA CHANNEL IN CDMA SYSTEMS

RELATED APPLICATIONS

This is a division of application Ser. No. 10/779,518 filed 13 Feb. 2004, which claims priority from Provisional Application Ser. No. 60/447,432 filed 14 Feb. 2003, and Provisional Application Ser. No. 60/479,551 filed 18 Jun. 2003, the contents of which applications are incorporated herein in their entireties by reference.

BACKGROUND OF THE INVENTION

Code division multiple access (CDMA) systems are interference-limited systems. Since all mobile stations operate at the same frequency, internal interference generated within the system plays a critical role in determining system capacity and voice quality. The transmit power from each mobile station is controlled to limit interference while maintaining desired performance objectives, e.g., bit error rate (BER), frame error rate (FER), capacity, dropped-call rate, coverage, etc.

One technique used in CDMA systems to reduce interference is power control. Power control is used on the reverse link in CDMA systems to control the power of signals received at each base station from the mobile stations. The purpose of power control in conventional CDMA systems is to ensure that each mobile station served by a particular base station approximately provides the minimal required signal strength required to ensure its Quality of Service (QoS). In conventional CDMA systems, system capacity is maximized if the transmit power level of each mobile station is controlled so that its signals arrive at the base station receiver with the minimum required signal-to-noise ratio (SNR). In third generation (3G) CDMA systems that allow variable data rates, the received power of mobile stations operating at the same data rate should be the same, although the received power of mobile stations operating at different data rates may be different because higher data rates require higher transmission power to maintain signal quality standards.

As a mobile station moves within the network, the channel conditions change continuously due to fast and slow fading, shadowing, number of users, external interference, and other factors. Power control algorithms dynamically control the transmit power on the reverse link to maintain a minimum required SNR at the base station under all conditions. Both open loop and closed loop power control are used for power control on the reverse link. In open loop control, the mobile station monitors the received signal strength on the forward link and varies its transmit power inversely in proportion to the measured signal strength. However, fading sources in mobile radio systems require much faster power control than is possible with open loop control. Fast power control may therefore be provided by the closed loop power control mechanism. In closed loop power control, the base station measures the strength of the pilot signal from the mobile station, computes the SNR, and sends power control commands to the mobile station directing the mobile station to either increase or decrease its transmit power depending on the received SNR. The power control commands typically comprise power control bits (PCBs), which are sent at a rate of 800 bps. A bit value of "1" directs the mobile station to decrease its transmit power. A bit value of "0" directs the mobile station to increase its transmit power. In conventional CDMA systems, the traffic channels have a fixed power offset from the pilot channel, so controlling the power of the pilot channel effectively controls the transmit power of the traffic channels as well.

Revision D of the cdma2000 standard includes a high-speed reverse link traffic channel. Mobile stations may transmit at a variable rate on the reverse link traffic channel. The cdma2000 standard specifies the rates at which the mobile station may transmit. Associated with each rate level is a pilot reference level and power offset that varies depending on the data transmission rate to ensure that the received pilot strength is sufficient to support that data transmission rate. As described above, the inner loop power control mechanism for cdma2000 operates by maintaining the received SNR of the reverse pilot channel at some predetermined level, referred to herein as the power control set point. Thus, when the mobile station changes its data transmission rate, the base station needs to adjust the power control set point.

In systems where the base station controls and schedules the data transmission rate of the mobile station, the base station can account for the different pilot reference levels to perform inner loop power control. In this case, the mobile station negotiates with the base station so that the base station can select the appropriate data transmission rate for the mobile station based on the mobile station's desired data transmission rate and the reverse link load. Allowing the mobile station to autonomously select its data transmission rate on the reverse traffic channel would avoid the negotiation process between the base station and the mobile station. However, if the mobile station autonomously changes its data transmission rate such that a new pilot reference level is transmitted by the mobile station, the sudden change in the received strength of the pilot signal at the base station would disrupt the inner loop power control mechanism unless the base station was notified of the rate change in advance.

It has been proposed that the mobile station transmit a rate indication to the base station before it changes its data transmission rate so that the base station can account for differences in pilot signal levels at different rates. Such a proposal includes a complicated signaling scheme to ensure that the base station detects the rate indication before the mobile station transmits data frames at the new data transmission rate. However, the signaling required results in significant delays between the time that the mobile station selects a data transmission rate and the time that it is allowed to transmit at the selected rate. Given that channel conditions and the availability of communication resources change with time, the mobile station needs to select a data transmission rate conservatively to ensure that this system has sufficient communication resources when it starts transmitting at the selected rate. The need to be conservative in rate selection means that the system is not functioning as efficiently as possible.

SUMMARY OF THE INVENTION

The present invention relates to a method of closed loop power control. Each mobile station transmitting on the reverse traffic channel transmits a reference signal used for power control on a data rate invariant overhead channel. The data rate invariant overhead channel may, for example, be a reverse packet data control channel in a CDMA system. The radio base station (RBS) compares the strength of the reference signal to a power control set point and generates a power control signal responsive to the comparison for transmission to the mobile station. The power control signal may comprise, for example, power control bits transmitted on a forward fundamental channel or a forward common power control channel.

The overhead channel that serves as the power control reference may be encoded to enable detection of bit errors at the RBS. For example, the mobile station may encode the overhead channel with a cyclic redundancy check (CRC) code. The RBS may decode the overhead channel and determine a frame error rate associated with the overhead channel. The frame error rate may be used in an outer power control loop to adjust the power control set point for the inner power control loop.

In another aspect of the invention, a method of controlling a reverse link power of a mobile station in a wireless communication network comprises receiving a control signal from the mobile station that includes one or more codewords repeated at a desired power control rate, determining quality metrics corresponding to the repeated codewords, generating reverse link power control commands based on comparing the quality metrics to a power control set points, and transmitting the reverse link power control commands to the mobile station. The quality metrics may be correlation metrics obtained by comparing each repeated codeword to respective ones in a set of possible codewords.

Thus, a mobile station may transmit a reverse control channel that is divided into a plurality of slots having a slot timing corresponding to a desired power control rate. The mobile station encodes first control information to derive a first codeword. The first codeword is repetitively transmitted in successive slots of a control frame. The mobile station may further transmit error detection bits generated on the first control information to enable detection of frame errors at the receiver. The mobile station may encode the error detection bits to obtain a second codeword having a number of symbols equal to the number of slots in a frame. The second codeword may be used to encode each frame by applying each code symbol of the second codeword to a corresponding slot.

The radio base station separately decodes each slot of the control frame and determines a power control metric for each slot. In one exemplary embodiment, the RBS coherently correlates each slot with a set of possible slot-level codewords to obtain a correlation metric for each codeword, and selects one of the correlation metrics as a power metric for inner loop power control. For example, the selected correlation metric may correspond to the maximum likelihood codeword. The error detection code allows the RBS to detect frame errors and to compute a frame error rate. The RBS may adjust a power control set point based on the frame error rate.

DETAILED DESCRIPTION OF THE INVENTION

Figure 1:
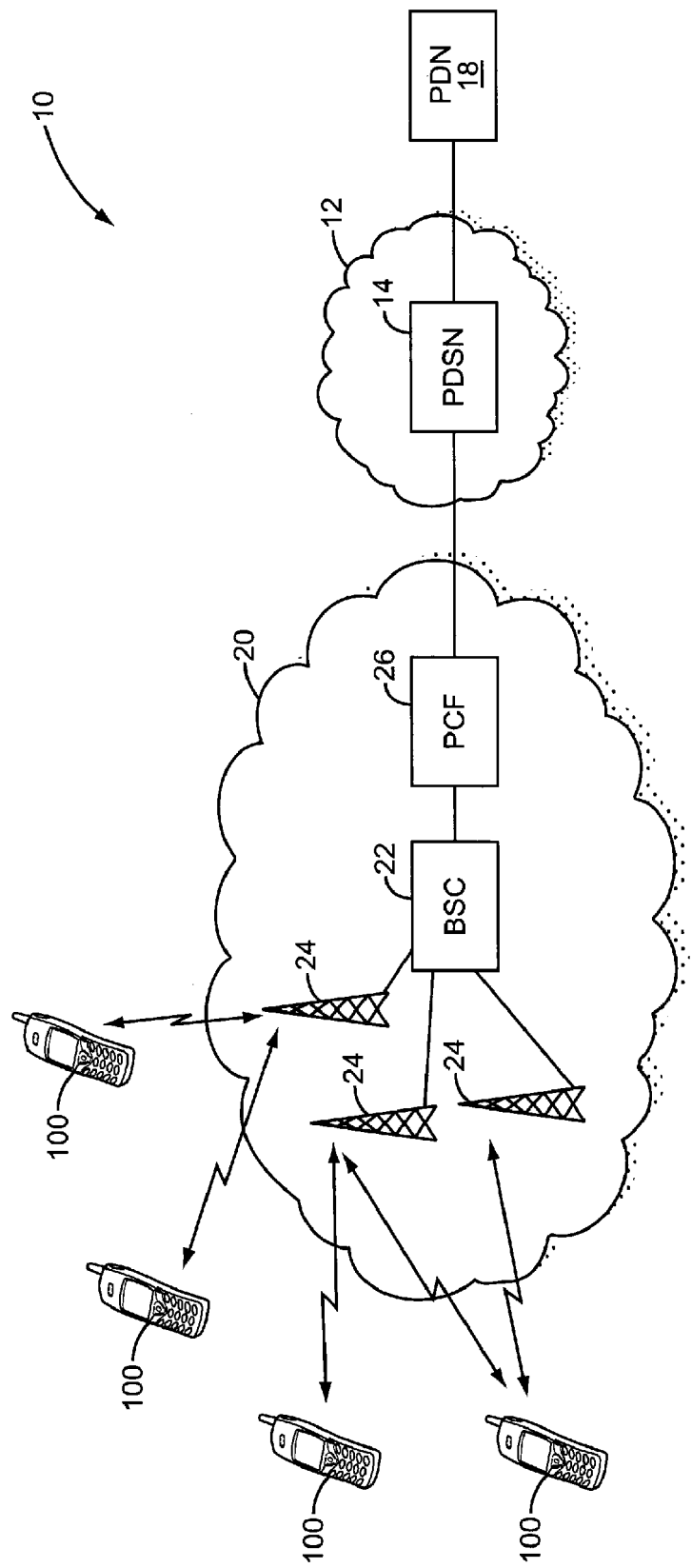
FIG. 1 is a diagram of an exemplary wireless communication network according to one or more embodiments of the present invention.

Referring now to FIG. 1, the present invention will be discussed in the context of a wireless communications network 10. The present invention was originally developed for use in code division multiple access (CDMA) networks and therefore the discussion will focus on CDMA networks 10 based on the cdma2000 standard. The present invention is particularly useful in systems based on the 1xEVolution (1xEV) of the cdma2000 standard, which includes both the 1xEV-DO (Data Only) and 1xEV-DV (Data and Voice) standards. However, the present invention could be adapted and employed in systems using other communication standards, such as Wideband CDMA (WCDMA) and the Universal Mobile Telecommunications System (UMTS).

Network 10 comprises a packet-switched core network 12, including at least one packet data serving node (PDSN) 14, and one or more radio access networks (RANs) 20 operatively connected to the core network 12. Each RAN 20 comprises at least one packet control function (PCF) 26, one or more base station controllers (BSCs) 22, and one or more RBSs 24.

Each RBS 24 comprises a plurality of transmitters and receivers and can simultaneously handle calls from many mobile stations 100. Each RBS 24 is located in and provides service to a geographic region referred to as a cell. In general there is one RBS 24 in a cell, but a cell could include multiple RBSs 24. The cell may be a sectorized cell that is divided into a number of sectors. A single RBS 24 may serve all sectors of a cell.

BSC 22 manages the communication resources for a plurality of RBSs 24 and coordinates the operations of multiple RBSs 24. The PCF 26 connects the BSC 22 to the PDSN 14 in the core network 12. PCF 26 routes calls and signaling messages between the PDSN 14 and the RBSs 24 via the BSC 22. The PDSN 14 connects to external Packet Data Networks (PDN) 18, such as the Internet and routes data.

Figure 2:
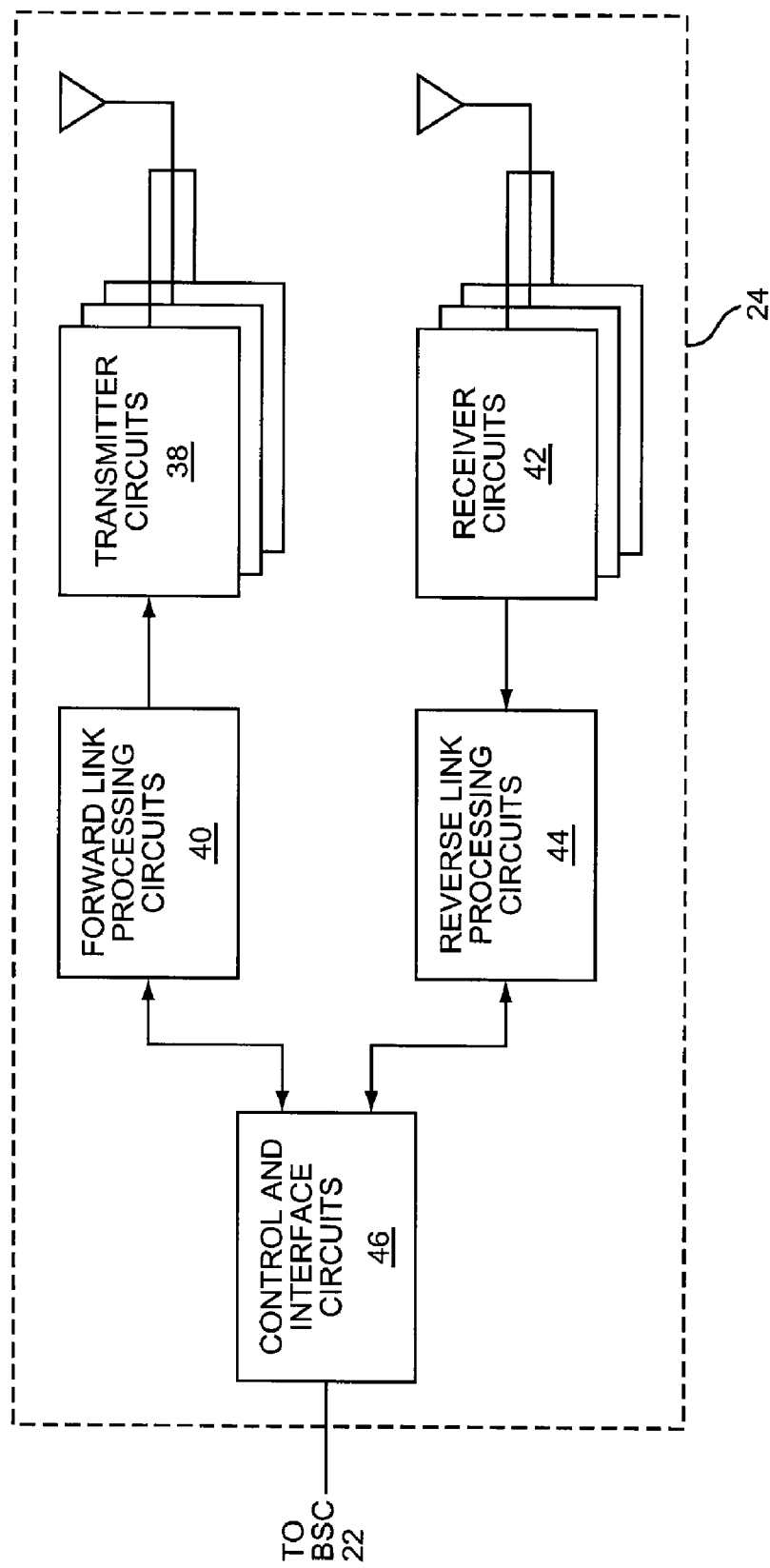
FIG. 2 is a functional block diagram of an exemplary radio base station according to the present invention.

FIG. 2 illustrates a functional diagram of an exemplary RBS 24 according to one embodiment of the present invention. It will be appreciated that the present invention is not limited to the RBS architecture illustrated in FIG. 2, and that other RBS architectures are applicable to the present invention. The functional elements of FIG. 2 may be implemented in software, hardware, or some combination of both. For example, one or more of the functional elements in RBS 24 may be implemented as stored program instructions executed by one or more microprocessors or other logic circuits included in RBS 24.

As shown in FIG. 2, RBS 24 includes transmitter circuits 38, forward link signal processing circuits 40, receiver circuits 42, reverse link signals processing circuits 44, and control and interface circuits 46. The transmitter circuits 38 include the necessary RF circuits, such as modulators and power amplifiers, to transmit signals to mobile stations 100. The forward link signal processing circuits 40 process the signals being transmitted to the mobile stations 100. Forward link signal processing may include digital modulation, encoding, interleaving, encryption, and formatting. The receiver circuits 42 comprise the RF components, such as a receiver front end, necessary to receive signals from the mobile stations 100. Reverse link processing circuits 44 process the signals received from the mobile stations 100. Reverse link processing may include, for example, digital demodulation, decoding, de-interleaving, and decryption. Control and interface circuits 46 coordinate the operation of the RBS 24 and the mobile stations 100 according to the applicable communication standards and interface the RBS 24 with the BSC 22. The forward link processing circuits 40, reverse link processing circuits 44, and control and interface circuits 46 may be integrated in a single processor, or may be implemented in multiple processors, hardware circuits, or a combination of processors and hardware circuits.

Figure 3:
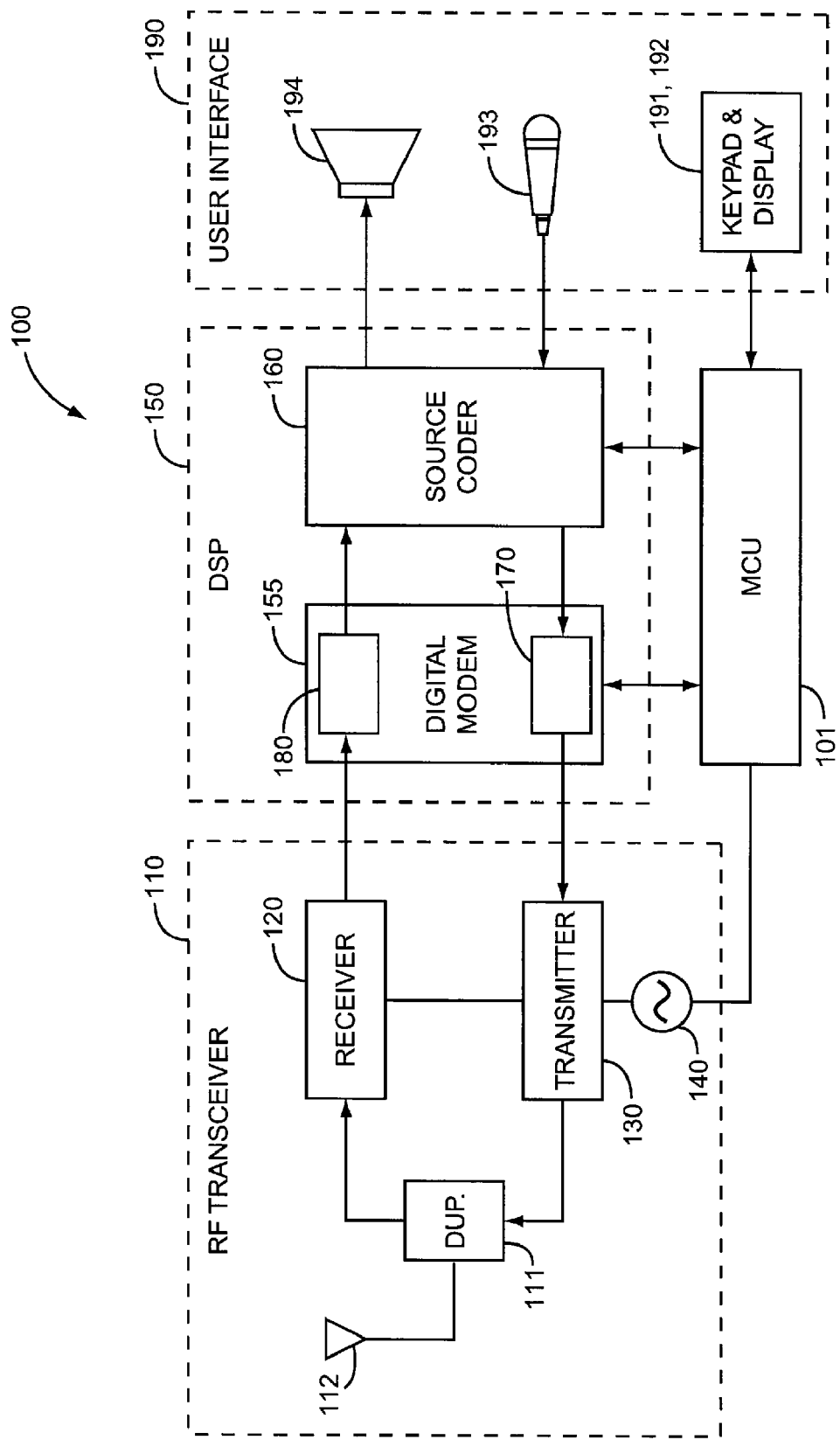
FIG. 3 is a functional block diagram of an exemplary mobile station according to the present invention.

FIG. 3 is a block diagram of a mobile terminal 100. The term mobile terminal 100 as used herein includes a cellular radiotelephone; a Personal Digital Assistant (PDA) that may combine a cellular radiotelephone with data processing, facsimile and data communications capabilities; a conventional laptop and/or palmtop computer equipped with a radiotelephone transceiver, or other appliance that includes a radio transceiver. Mobile terminals 100 may also be referred to as "pervasive computing" devices.

Mobile terminal 100 is a fully functional mobile radio transceiver capable of transmitting and receiving signals over a RF channel. Exemplary standards that may be implemented by the mobile terminal 100 include, but are not limited to, cdma2000, WCDMA, and UMTS. Mobile terminal 100 comprises a microcontroller unit (MCU) 101, a RF transceiver 110, a digital signal processor (DSP) 150, and a user interface 190. Mobile terminal 100 may additionally include an external interface for communication with a computer, local area network, or other device.

RF transceiver 110 establishes a link for wireless communications with the RBS 24. RF transceiver 110 comprises a receiver 120, transmitter 130, frequency synthesizer 140, duplexer or switch 111, and antenna 112. Receiver 120 receives downlink or forward link communications from the RBS 24. Receiver 120 amplifies and downconverts received signals to a baseband frequency for processing by the DSP 150. Transmitter 130 sends uplink or reverse link communications to the base station 12. Transmitter 130 receives baseband signals from the DSP 150, which the transmitter 130 amplifies and uses to modulate an RF carrier at a directed power level. Frequency synthesizer 140 provides the reference signals used for frequency translation in the receiver 120 and transmitter 130. Receiver 120 and transmitter 130 are coupled to antenna 112 by duplexer or switch 111. Duplexer 111 includes a duplex filter to isolate the transmitter 130 from the receiver 120. The duplex filter combines a transmit-band filter and receiver-band filter to provide the necessary isolation between the two paths.

DSP 150 comprises a digital modem 155 and a source coder 160. Source coder 160 includes a speech coder (not shown) for digitizing and coding speech from microphone 193 for transmission on the reverse link to the RBS 24. Additionally, the speech coder decodes speech signals received from the RBS 24 and converts speech signals into audio signals that are output to speaker 194. Speech is typically encoded at rates of 9.6 kilobits per second or 13.3 kilobits per second.

The digital modem 155 processes digital signals to make communication over the propagation channel more robust. Digital modem 155 includes a digital modulator 170 and at least one demodulator 180. The digital modulator 170 superimposes the message waveform onto a carrier for radio transmission using techniques that guard against fading and other impairments of the radio channel while attempting to maximize bandwidth efficiency. Modulator 170 may also perform channel coding and encryption if used. The digital demodulator 180 detects and recovers the message transmitted by RBS 24. It tracks the received signal, estimates received signal strengths, rejects interference, and extracts the message data from noisy signals. Demodulator 180 also performs synchronization, channel decoding, and decryption if used.

The MCU 101 supervises the operation of the mobile terminal 100 and administers the procedures associated with the applicable communication protocol. The MCU 101 implements the communication protocols used by the mobile terminal 100. The communication protocol specifies timing, multiple access approach, modulation format, frame structure, power level, as well as many other aspects of mobile terminal operation. The MCU 101 inserts signaling messages into the transmitted signals and extracts signaling messages from the received signals. MCU 101 acts on signaling messages received from the RBS 24 as set forth in the communication protocol. When the user enters commands via the keypad and display 191, 192 and/or microphone 193 of the user interface 190, the commands are passed to the MCU 101 for action.

A plurality of mobile stations 100 send packet data to the RBS 24 over a reverse link traffic channel, which in the exemplary embodiment described herein is a Reverse Packet Data Channel (R-PDCH). RBS 24 controls the transmit power level of the mobile stations 100 using closed loop power control. The closed loop power control mechanism includes an inner power control loop and an outer power control loop. In one exemplary embodiment of the invention, power measurements for inner loop power control are made on an overhead channel, such as the Reverse Packet Data Control Channel (R-PDCCH). In contrast, conventional systems make power measurements on the Reverse Pilot Channel (R-PICH). In the exemplary embodiment, the R-PICH is still used for channel estimation. In the exemplary embodiment, the transmit power of the mobile station 100 on the R-PDCCH is data rate invariant and serves as a power reference for all other reverse link channels. The transmit power on the R-PDCCH does not vary with the data transmission rate, but only in response to changes in channel conditions. Alternatively, the control channel transmit power varies in a known relationship with the transmit data rate of the reverse packet data channel. The transmit power of the mobile station 100 on the R-PICH and R-PDCH and other reverse link channels is determined relative to the R-PDCCH. The channel gains of the R-PDCH and R-PICH relative to the R-PDCCH may be fixed, or may vary depending on the data transmission rate of the mobile station 100.

The inner power control loop adjusts the mobile station transmit power to maintain a signal quality metric associated with the R-PDCCH as close as possible to a targeted power control set point. The outer loop power control mechanism adjusts the power control set point for a given mobile station 100 depending on frame error rate (FER) or some other performance metric. As will be described in greater detail below, the R-PDCCH is protected by a cyclic redundancy check (CRC) code and may also be used for outer loop power control.

To perform inner loop power control, the RBS 24 compares the signal quality metric to a power control set point. The RBS 24 transmits a power control bit (PCB) to the mobile station 100 depending on the outcome of the comparison. If the signal quality metric is above the power control set point, the RBS 24 transmits a "1." Conversely, if the signal quality metric is below the power control set point, the RBS 24 transmits a "0." A PCB having a value of "1" is interpreted by the mobile station 100 as a command to decrease its transmit power level by δ dB. Similarly, a PCB having a value of "0" is interpreted by the mobile station 100 as a command to increase its transmit power by δ dB. Thus, the mobile station 100 adjusts its transmit power up or down by δ dB responsive to each power control bit. In some embodiments, the power metric may be compared to upper and lower thresholds, and the RBS 24 may send a command to the mobile station 100 to hold its current transmit power if the power metric is between the upper and lower thresholds. The RBS 24 transmits power control bits (PCBs) to the mobile station 100 on a fundamental channel or, if there is no assigned fundamental channel, a forward common power control channel (F-CPCCH).

Because the relationship between signal quality metric and frame error rate may be non-linear, the RBS 24 may adjust the power control set point depending on factors such as vehicle speed and channel conditions. In general, performance as measured by FER varies with changing vehicle speed. Thus, the outer power control loop at the RBS 24 periodically adjusts the set point to maintain the signal quality as measured by the FER at a desired target FER value. For outer loop power control, the RBS 24 measures the FER of the R-PDCH.

The mobile stations 100 may autonomously change their data transmission rate on the R-PDCH depending on channel conditions. The permissible data transmission rates, referred to herein as rate levels, are specified by the standard. To support high data rates, the pilot reference level needs to be increased to improve channel estimation. Increasing the pilot reference level may be accomplished by increasing the mobile transmit power on the R-PICH or by transmitting on a reverse secondary pilot channel (R-SPICH). Unlike prior art systems, increasing the transmit power on the R-PICH does not disrupt inner loop power control because power measurements are made on the R-PDCCH. By using a data rate invariant control channel to perform inner loop control, the power control set point will be the same for all rate levels and the mobile station 100 can change rate levels autonomously without disrupting the inner loop power control by the RBS 24.

Figure 4:
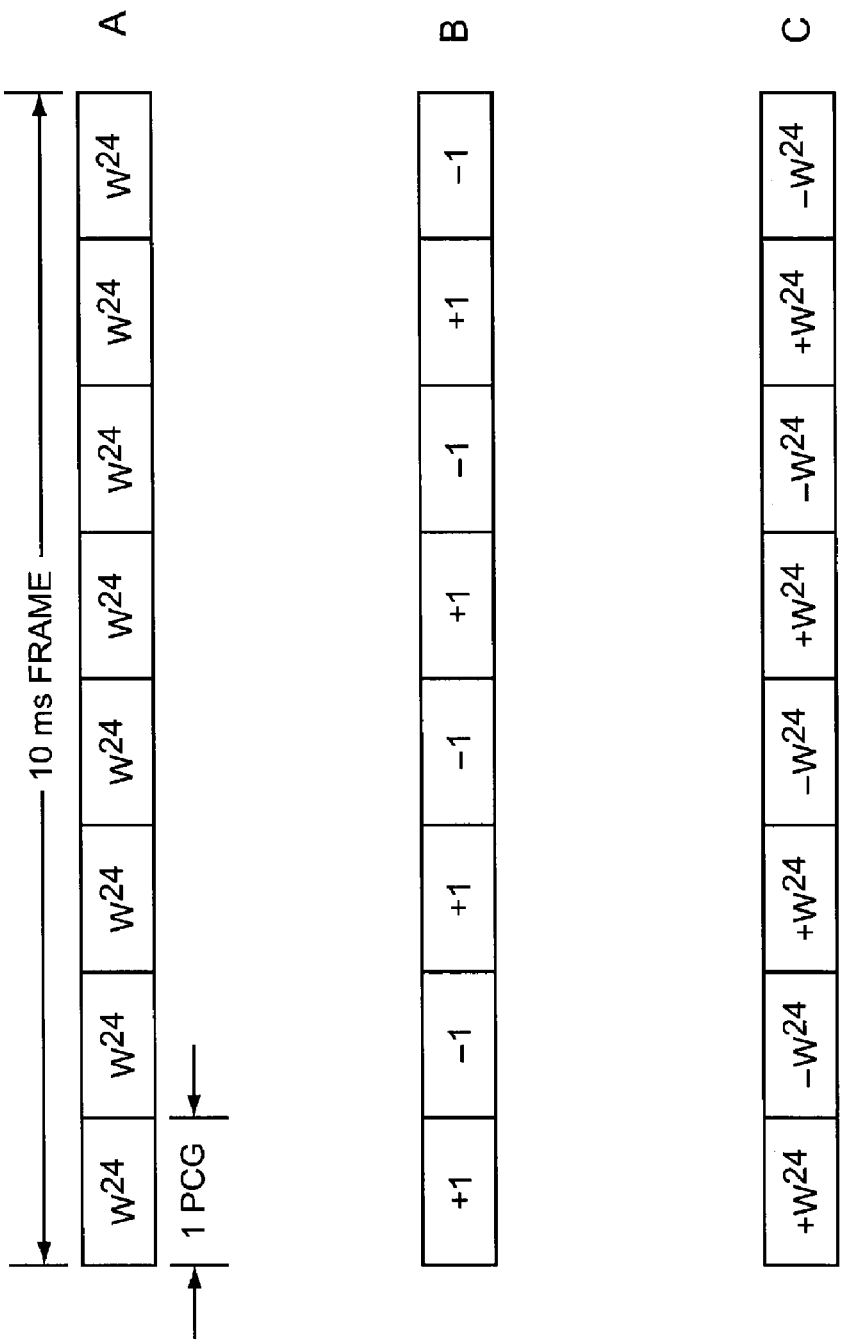
FIG. 4 illustrates an exemplary encoding scheme for an exemplary R-PDCCH that is used for inner loop power control.

FIG. 4 illustrates the encoding of the R-PDCCH in one exemplary embodiment of the invention. The R-PDCCH frame in FIG. 4 is 10 ms in length and is divided into a plurality of power control slots. The slot timing corresponds to a desired power control rate. In one exemplary embodiment, the frame is divided into 8 power control slots and each power control slot is 1.25 ms in length. Thus, the RBS 24 power controls the mobile station 100 at a rate of 800 Hz. In a preferred embodiment, the frame length of the R-PDCCH is the same as the R-PDCH. Each slot carries a 24-bit codeword, such as a 24-bit Walsh code, as shown at A. The slot-level codeword is repeated in each power control slot. The polarity of each power control slot is determined by a frame-level codeword equal in length to the number of power control slots in a frame as shown at B. The polarity of each power control slot forms an element of the frame-level codeword. The final frame is a composite of the repeated slot-level codeword and the frame-level codeword as shown at C.

Figure 5:
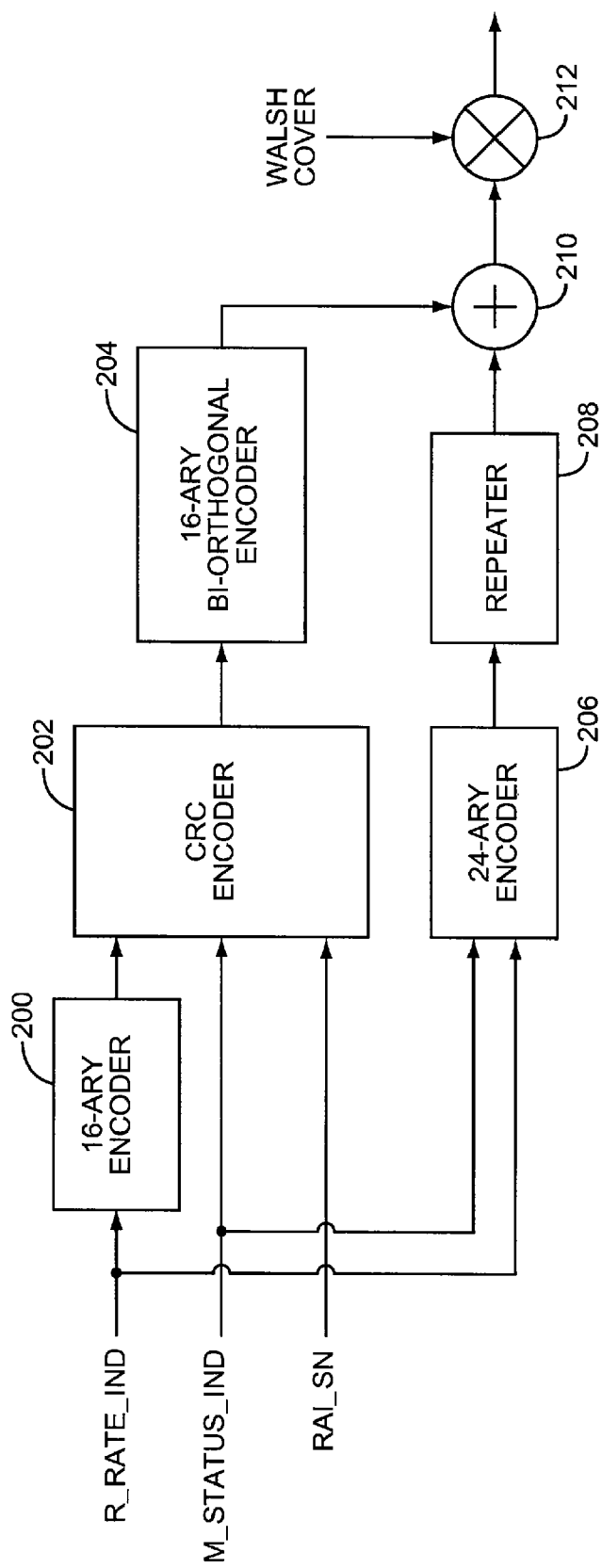
FIG. 5 illustrates the channel structure of the exemplary R-PDCCH.

FIG. 5 illustrates in more detail the structure of the exemplary R-PDCCH. The exemplary R-PDCCH frame carries control information needed to demodulate the corresponding R-PDCH frame transmitted during the same frame duration and information relating to rate increase requests. The control information comprises a Reverse Data Rate Indicator (R_RATE_IND) to specify the data rate and modulation and coding scheme (MCS) for the R-PDCH, a Mobile Station Status Indicator (MS_STATUS_IND) to indicate when the mobile station 100 is capable and ready to transmit at a higher rate, and a Reverse Link ARQ Identifier Sequence Number (RAI_SN) to indicate when a new encoder packet transmission has begun.

A 16-ary code generator 200 maps the R-RATE_IND to one of sixteen possible value. The resulting 4-bit value is input to a CRC encoder 202 along with the 1-bit MS_STATUS_IND and 1-bit RAI_SN. The CRC encoder generates a 3-bit CRC codeword. The generator polynomial for the CRC encoder 202 is $g(x)=x^3+x^2+1$. The 3-bit CRC codeword and 1-bit RAI_SN or MS_STATUS_IND are output by the CRC encoder 202 to a 16-ary bio-orthogonal encoder 204. The bi-orthogonal encoder 204 maps the 4-bit sequence (CRC+RAI_SN or MS_STATUS_IND) to one of sixteen possible codewords. The codeword output from the bi-orthogonal encoder 204 is a 100 sps sequence and is used as the frame-level codeword. Each element of the frame-level codeword corresponds to one power control slot and determines the polarity of the corresponding power control slot.

A 24-ary Hadamard encoder 206 maps the R_RATE_IND and MS_STATUS_IND or RAI_SN to a 24-ary Walsh codeword. The 24-ary Walsh codeword output by the Hadamard encoder 206 comprises the slot level codeword. The Walsh codeword output from the Hadamard encoder 206 is repeated by a repeater 208 at the desired power control rate. The output of the Hadamard encoder 206 is a 100 sps symbol sequence, which is increased to 800 sps by the repeater 208. The 800 sps sequence output from the repeater 208 is combined with the 100 sps sequence output from encoder 204 in combiner 210, and a Walsh cover is applied to the combined sequence by spreader 212. Because each power control slot is separately decodable by the RBS 24, the RBS 24 can coherently correlate the slot-level codeword to obtain a correlation metric with a phase reference. Further, because each frame is protected by a CRC, outer loop power control can be performed on the R-PDCCH.

Those skilled in the art should appreciate that encoder 206 in general produces a first codeword that is repeated on a per slot basis to effect a desired repetition rate, e.g., a desired power control rate. While it is described as a Hadamard-based encoder, it may of course be configured according to different coding operations. By way of example, encoder 206 comprises one of a Hadamard encoder, a bi-orthogonal encoder, or a complementary orthogonal encoder. Similarly, it should be understood that encoder 204 in general produces a second codeword that is combined in a desired manner with the first codeword and that the encoding operations of encoder 204 can be configured as needed or desired. By way of non-limiting example, encoder 204 can be configured as an orthogonal encoder, complementary or otherwise, or configured as a bi-orthogonal encoder. Regardless, in one or more exemplary embodiments, the second codeword has a number of symbols equal to the number of repetitions of the first codeword, and each symbol of the second codeword is applied to a respective repetition of the first codeword.

Thus, first control information related to the R-PDCH, e.g., rate and status information, can be encoded to form the first codeword, which is then repeated at the desired slot rate. Further, second control information, e.g., other status/activity information, can be encoded to form the second codeword, which then is applied to the first codeword. As indicated, the second codeword also may include encoded error detection information, such as CRC data, that can be used at the base station to detect "frame" errors or the like for the R-PDCCH. As explained herein, such error detection serves as one basis for making outer loop power adjustments, while the slot-repeated first codeword provides a basis for high-rate inner loop power control.

Figure 6:
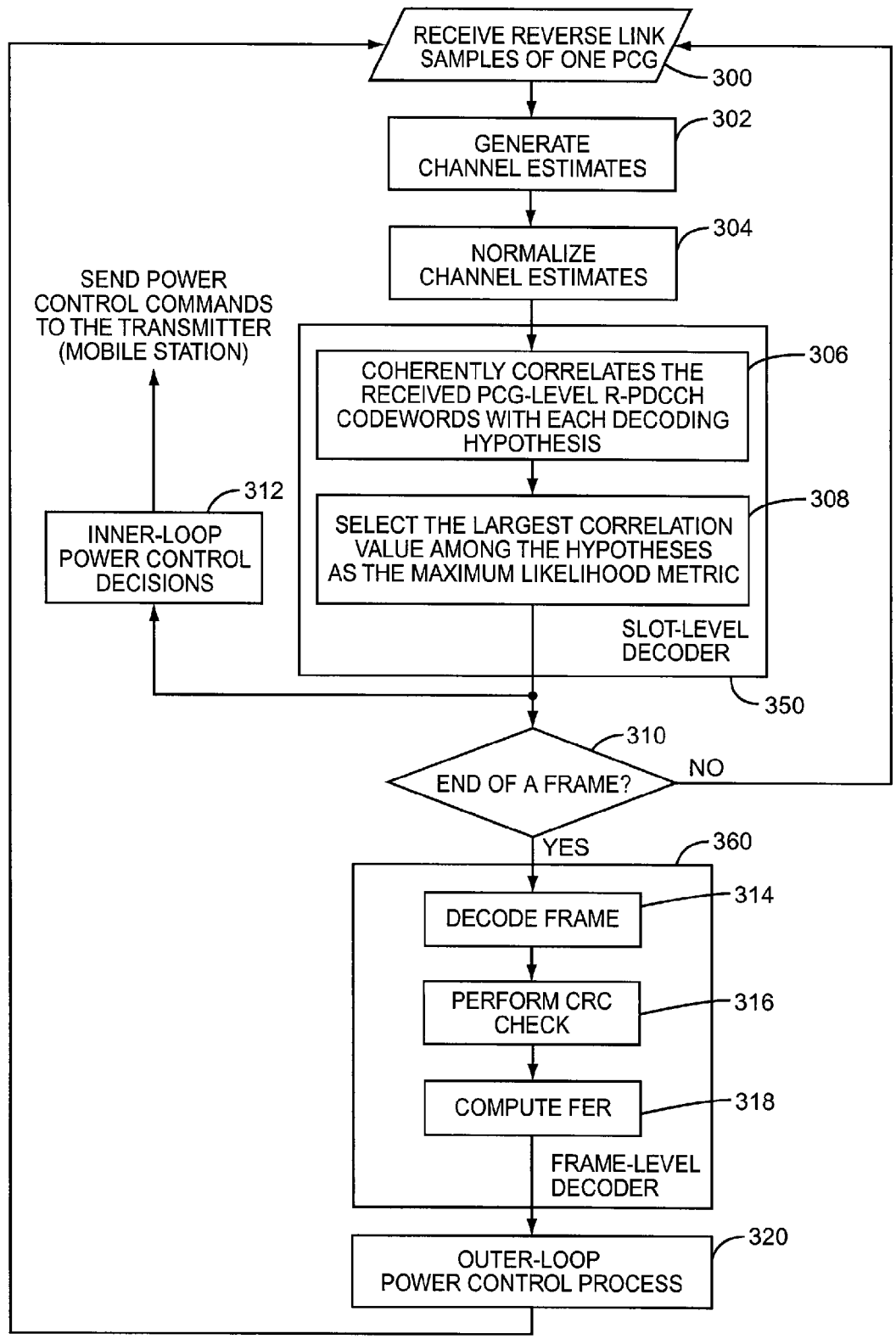
FIG. 6 is a flow diagram of a closed loop power control procedure that uses the R-PDCCH for inner loop and outer loop power control.

FIG. 6 illustrates an exemplary power control procedure. The RBS 24 receives reverse link samples during one power control slot (block 300). The received samples include pilot samples and R-PDCCH samples. The RBS 24 generates channel estimates based on the received pilot samples (block 302). The received pilot samples may be filtered with a causal filter, such as a Weiner filter. If y represents the vector of the received pilot symbols and x represents the vector of the true pilot symbols, the causal filtering may be performed according to:

$$\hat{x} = R_{xy} R_{yy}^{-} y, \quad \text{Eq. 1}$$

where $R_{xy}$ is the cross-covariance matrix of the received pilot symbol vector y and $R_{yy}$ is the auto-covariance matrix of the received pilot symbol vector. The cross-covariance matrix $R_{xy}$ may be computed according to:

$$R_{xy} = E\{xy^H\} \quad \text{Eq. 2}$$

The auto-covariance matrix $R_{yy}$ may be computed according to:

$$R_{yy} = E\{yy^H\} \quad \text{Eq. 3}$$

The filter may be fixed or may be adaptive. A simple, fixed filter design should take into account the worst-case Doppler spread, e.g., the Wiener solution corresponding to 5% normalized Doppler spread.

The channel estimate provides a phase reference for coherent power estimation. In the exemplary embodiment, the channel gain of the R-PICH may vary relative to the R-PDCCH. In this case, the channel estimates should be normalized to obtain relative magnitudes for the pilot samples (block 304). In other embodiments, the channel gain of the pilot channel R-PICH may be fixed relative to the R-PDCCH and the normalization step is not required.

The normalized channel estimates and R-PDCCH are input to a slot-level decoder 350, which may be part of the reverse link processing circuits 44. The normalization can simply use, $\hat{x}/\|\hat{x}\|$, which is the vector of the pilot samples divided by its norm. The sample vector of the R-PDCCH samples corresponding to one power control slot is multiplied element by element by a channel estimate vector to adjust the phase of the sample vector. The decoder 350 then coherently correlates the sample vector with each possible slot-level codeword (block 306) and selects the largest correlation metric as the power estimate (block 308). The correlation metric is obtained by computing the product of the sample vector and codeword vector. The power estimate is input to the inner-loop decision process (block 312), which generates a power control bit for transmission to a mobile station 100.

Following each power control slot, the RBS 24 determines if the end of a frame has been reached (block 310). If not, the process described above repeats until the end of the frame is reached. When the end of a frame is reached (block 310), the frame-level decoder 360 decodes the frame-level codeword (block 314), performs a CRC check (block 316) to determine if there is a frame error (block 314), and computes a frame error rate (FER) (block 318). Frame-level decoder 360 may be part of the reverse link processing circuits 44. The FER may be used to perform outer-loop power control. If so, the FER is input to an outer-loop power control process (block 320), which may adjust the power control set-point used by the inner-loop power control process (block 312).

Figure 7:
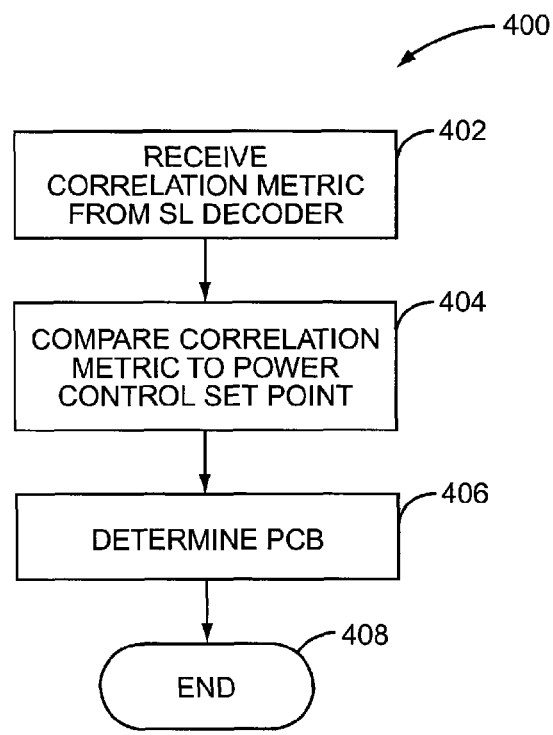
FIG. 7 is a flow diagram illustrating an exemplary inner loop power control process in the closed loop power control procedure of FIG. 6.

FIG. 7 is a flow diagram illustrating an exemplary procedure 400 for inner loop power control. The RBS 24 receives the signal quality metric (e.g., the correlation metric) from the slot level decoder 350 (block 402) and compares the signal quality metric to a power control set point (block 404). Based on the comparison, the RBS 24 determines the power control bit (block 406) to send to the mobile station 100. In a preferred embodiment of the invention, the R-PDCCH provides the power reference for all other reverse link channels. Therefore, the mobile station 100 adjusts the transmit power on the R-PDCCH responsive to the PCB and then applies the appropriate offset to determine the transmit powers for the other reverse link channels.

Figure 8:
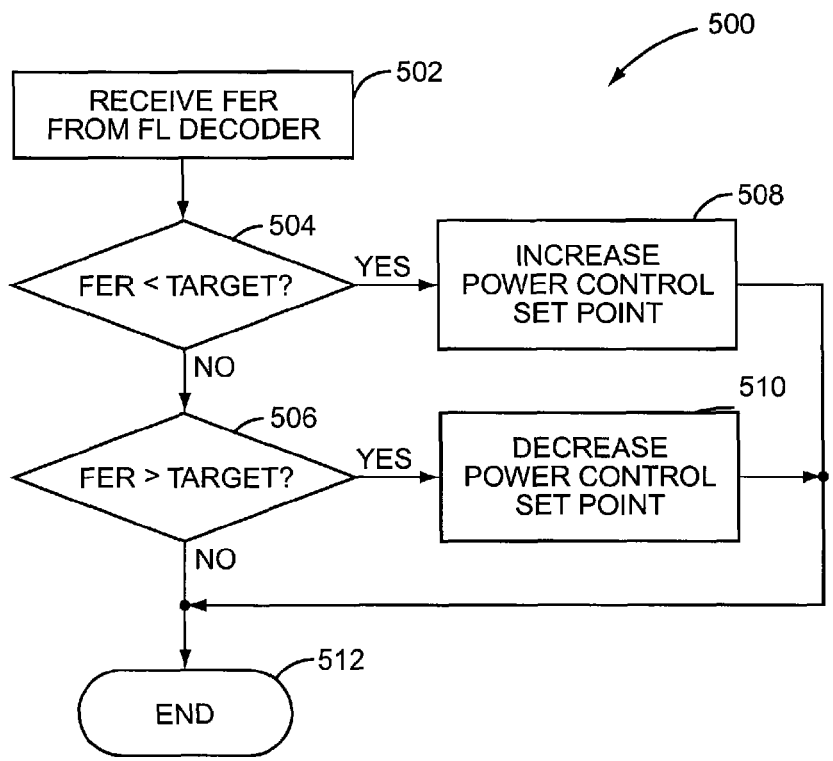
FIG. 8 is a flow diagram illustrating an exemplary outer loop power control process in the closed loop power control procedure of FIG. 6.

FIG. 8 is a flow diagram illustrating an exemplary procedure 500 for outer loop power control. The FER computed by the frame-level decoder 360 is input to the outer loop power control process 320 (block 502). The outer loop power control function 360 compares the computed FER to a target (blocks 504 and 506). If the FER is less than the target (block 504), the RBS 24 increases the power control set point (block 508). Conversely, if the FER is greater than the target (block 506), the RBS 24 decreases the power control set point (block 510). The procedure ends after the adjustment is made (block 512).

Figure 9:
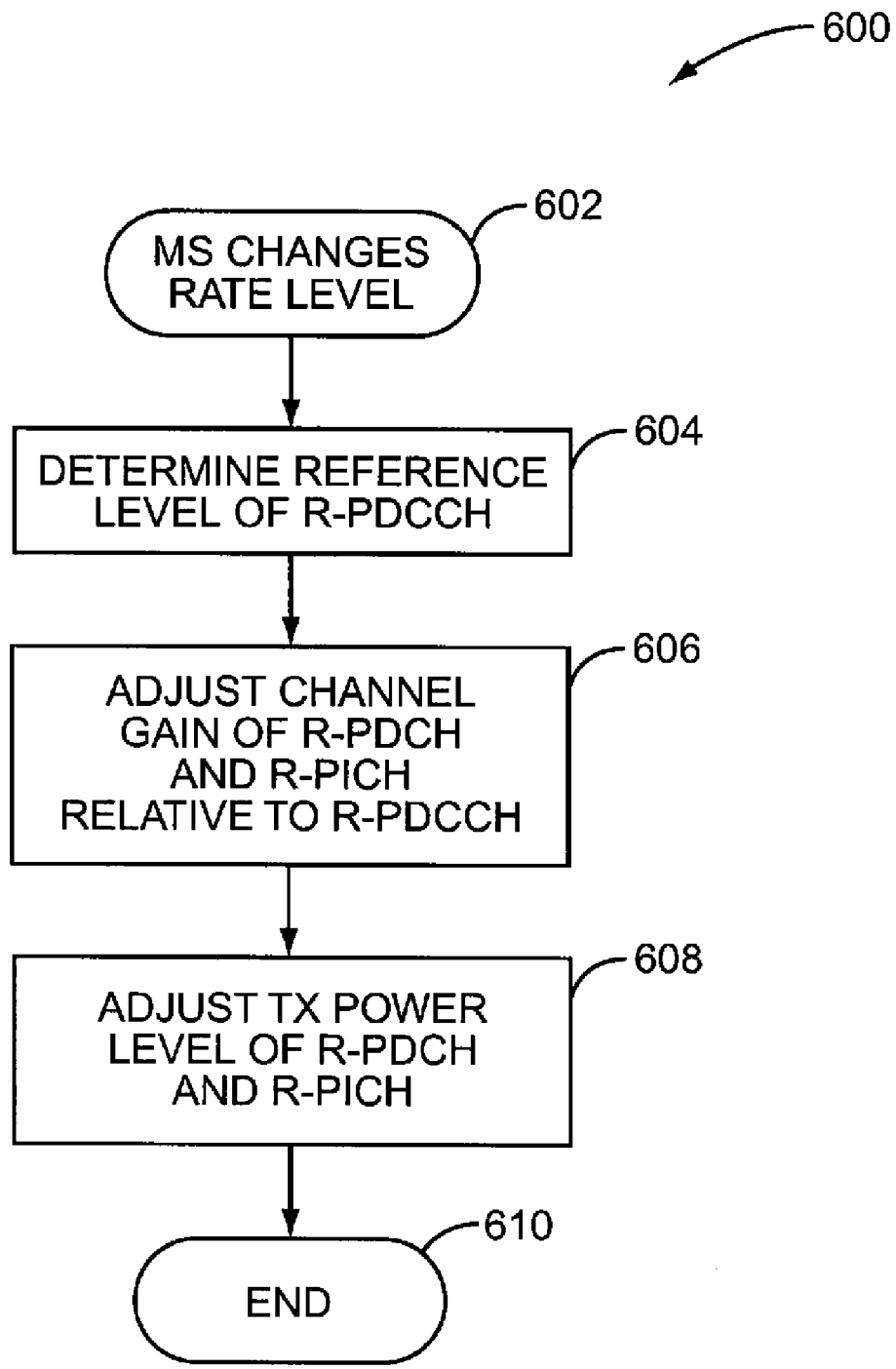
FIG. 9 is a flow diagram illustrating a procedure implemented in a mobile station for adjusting its transmit power level responsive to a change in data transmission rate.

FIG. 9 is a flow diagram illustrating an exemplary power adjustment procedure 600 implemented by the mobile station 100 after a rate increase. The procedure 600 begins when the mobile station 100 either autonomously changes its data transmission rate, or is commanded to adjust its rate by the RBS 24. After the mobile station 100 changes its data transmission rate (block 602), the mobile station 100 determines the reference level of the R-PDCCH for the new rate (block 604) and adjusts the channel gains of the R-PICH, R-PDCH, and other reverse link channels relative to the R-PDCCH (block 606). Once the channel gains relative to the R-PDCCH are determined, the mobile station 100 adjusts the transmit power of the R-PICH, R-PDCH and other reverse link channels (block 608) based on the R-PDCCH power and the channel gains. The procedure ends (block 610) after all adjustments are made.

By using the received power of the R-PDCCH for inner loop power control, the mobile station 100 can autonomously change its data transmission rate without the need to signal the RBS 24 before it can begin transmitting at the selected rate. The elimination of signaling delays will allow the mobile station 100 to more rapidly respond to changes in channel conditions and result in more efficient use of the reverse traffic channel. Further, the present invention does not require allocation of resources for a secondary pilot channel. The present invention may nevertheless be of some benefit even when a secondary pilot channel is used because the code structure of the R-PDCCH will improve the quality of the SNR estimates used for inner loop power control.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of controlling a reverse link transmit power of a mobile station in a wireless communication network, the method comprising:
   receiving a control signal from the mobile station over a control channel associated with a reverse packet data channel associated with the mobile station, wherein the control channel has a data rate invariant transmit power level that does not vary with a transmit data rate of the reverse packet data channel or has a transmit power that varies in a known relationship with the transmit data rate of the reverse packet data channel;

comparing the strength of the control signal to a power control set point;

generating a power control signal responsive to the comparison of the control signal to the power control set point; and transmitting the power control signal to the mobile station, said power control signal controlling the reverse link transmit power of the mobile station.

2. The method of claim 1 further comprising determining a frame error rate for the control channel and adjusting the power control set point based on the frame error rate.

3. The method of claim 2 wherein the control signal includes error detection coding and wherein determining the frame error rate for the control channel comprises decoding the control signal based on the error detection coding to determine the frame error rate.

4. A radio base station comprising:

a receiver to receive from a mobile station:

a traffic signal transmitted over a data rate variant traffic channel having a transmit power level that varies depending on a data transmission rate on the traffic channel;

a control signal transmitted over a data rate invariant control channel having a data rate that does not change with the data transmission rate on the traffic channel;

a transmitter to transmit power control signals to the mobile station, for controlling a reverse link transmit power of the mobile station; and a control unit to determine the power control signals based on the strength of the control signals received over the control channel.

5. The radio base station of claim 4 wherein the control unit determines the power control signals by comparing the strength of the control signals to a power control set point.

6. The radio base station of claim 5 wherein the control signal includes error detection coding and wherein the radio base station uses error detection coding to determine a frame error rate.

7. The radio base station of claim 6 wherein the control unit adjusts the power control set point based on the frame error rate for the control channel.

8. The radio base station of claim 7 wherein the error detection coding is a cyclic redundancy check code.

* * * * *